UNITED STATES PATENT OFFICE.

STEPHEN L. GOODALE, OF SACO, MAINE.

FERTILIZER.

SPECIFICATION forming part of Letters Patent No. 382,604, dated May 8, 1888.

Application filed February 21, 1887. Serial No. 228,364. (No specimens.)

*To all whom it may concern:*

Be it known that I, STEPHEN L. GOODALE, residing at Saco, in the county of York and State of Maine, have invented certain new and useful Improvements in Fertilizers; and I do hereby declare that the following is a full, clear, and exact description of the invention, which will enable others skilled in the art to which it appertains to make and use the same.

This invention has relation to certain new and valuable improvements in the manufacture of fertilizing substances.

My said improvement relates to the treatment of such crude or native minerals as contain in any considerable amounts hydrated aluminic and ferric phosphates, or either of them. These, as has long been well known, are ill adapted for the manufacture of superphosphates by the methods usually pursued. By the improvement in treating said minerals as hereinafter specified substantially all the contained phosphoric acid is readily and easily converted from an unavailable and insoluble state into one in which it is quickly assimilable by plants. The process by which this change is brought about comprises three stages or steps.

First. The raw material is reduced to a powdery or pulverulent state by any convenient method.

Second. The pulverulent raw material has incorporated with it a small proportion of some carbonaceous material which has been previously moistened with oil of vitriol, ($H_2SO_4$.) For a carbonaceous matter various materials may be used—for example, charcoal, sawdust, or other kindred or equivalent substances; but it should not be damp enough to part with any of its moisture to the pulverulent material with which it is to be mixed. Of said moistened carbonaceous substance I usually employ about two or three parts, by weight, with one hundred parts of a pulverulent mineral containing about seventy parts of hydrated phosphates of alumina and iron. This proportion of carbonaceous material to the pulverulent mineral will vary, however, according to circumstances. It will be less or greater, conformably to a less or greater percentage of hydrated phosphates in the pulverulent mineral.

Third. This step of the process consists in subjecting the mass of mixed phosphates and acidulated carbonaceous material to a degree of heat sufficient to expel the constituent water contained in the hydrated phosphate. The degree of heat necessary for this purpose is not the same in all cases with said crude phosphates; but it rarely exceeds that required to melt lead—that is to say, rather below a red-heat—and subjection to said heat for about half an hour is usually sufficient for the purpose. The heat may be somewhat less or more or continued for a somewhat longer or shorter period without any perceptible detriment to the product.

In carrying out the third stage of the process I have found the following method to be very effective: The mixture is spread upon rather shallow iron pans, preferably covered. The covered pans are then passed through a furnace so constructed that they may be entered at an opening on one side and passed out through an opening on the other side. The pans are then emptied and refilled and again passed through the furnace. By this means rapid and continuous work is kept up with a few pans.

During the process of heating no agitation or manipulation is necessary. As soon after heating as it becomes cool the product is ready for application to the soil as a simply phosphatic fertilizer, or it may be combined with potassic or nitrogenous substances, or with both, in order to constitute a complete fertilizer—one which will furnish to plants all the elements of plant-food which are not supplied by average arable soils.

I am aware that heretofore phosphate of iron and alumina have been mixed with sulphate of soda, coal, and oxide of iron and roasted in a furnace until decomposition takes place and then thrown into a vat, whereby a solution of phosphate of soda free from iron is produced.

What I claim as my invention, and desire to make secure to myself by Letters Patent, is—

In the manufacture of fertilizing material, the herein-described process of making hydrated aluminic and ferric phosphates available as a plant-food, which consists in first mixing with pulverized crude mineral containing said phosphate carbonaceous matter and sulphuric acid and then heating the compound, substantially as set forth.

In testimony that I claim the foregoing as my own I have affixed my signature in the presence of two witnesses.

S. L. GOODALE.

Witnesses:
FRANK C. MCNEALLY,
M. H. KELLY.